US007162225B2

(12) United States Patent
Ranta

(10) Patent No.: US 7,162,225 B2
(45) Date of Patent: Jan. 9, 2007

(54) TRACING OF A MALICIOUS CALL

(75) Inventor: Tarja-Leena Ranta, Lohja (FI)

(73) Assignee: Nokia Corporation, Espoo (FI)

( * ) Notice: Subject to any disclaimer, the term of this patent is extended or adjusted under 35 U.S.C. 154(b) by 423 days.

(21) Appl. No.: 10/221,717

(22) PCT Filed: Feb. 22, 2001

(86) PCT No.: PCT/FI01/00182

§ 371 (c)(1),
(2), (4) Date: Jan. 13, 2003

(87) PCT Pub. No.: WO01/69901

PCT Pub. Date: Sep. 20, 2001

(65) Prior Publication Data
US 2003/0148754 A1    Aug. 7, 2003

(30) Foreign Application Priority Data
Mar. 17, 2000    (FI)    ................................ 20000632

(51) Int. Cl.
*H04M 3/42*    (2006.01)
(52) U.S. Cl. .............. 455/414.3; 455/414; 379/211.01; 379/88.19
(58) Field of Classification Search ................ 455/403, 455/414.1, 415, 414.3, 456.1, 432.3; 379/15.02, 379/32.01–32.05, 32.03, 142.04, 142.09, 379/201.01, 201.11, 210.03, 230, 221.09, 379/221.08, 88.19, 142.01
See application file for complete search history.

(56) References Cited

U.S. PATENT DOCUMENTS

| 4,530,051 A | * | 7/1985 | Johnson et al. ............. 709/203 |
| 5,590,171 A | * | 12/1996 | Howe et al. .................. 379/33 |
| 5,706,338 A | * | 1/1998 | Relyea et al. ............... 379/189 |
| 6,009,321 A | * | 12/1999 | Wang et al. ................. 455/410 |

FOREIGN PATENT DOCUMENTS

| EP | 0 439 927 A2 | 12/1990 |
| EP | 0 941 005 A3 | 9/1999 |
| WO | WO 97/42784 | 11/1997 |
| WO | WO 99/04546 | 1/1999 |

* cited by examiner

*Primary Examiner*—George Eng
*Assistant Examiner*—Nam Huynh
(74) *Attorney, Agent, or Firm*—Squire, Sanders & Dempsey L.L.P.

(57) ABSTRACT

The invention relates to tracing of a malicious call to be implemented in a telecommunications network, especially in a mobile communication network. The inventive idea is that the called subscriber activates the tracing service in real time on finding the call to be malicious. One way of activating the tracing service is a service code sent from the called subscriber's terminal equipment and defined by the operator. The means required for implementing the service may be located according to the operator's wishes either in a mobile services switching center or in an intelligent network.

8 Claims, 3 Drawing Sheets

TRACING OF A MALICIOUS CALL

FIELD OF THE INVENTION

Figure 1:
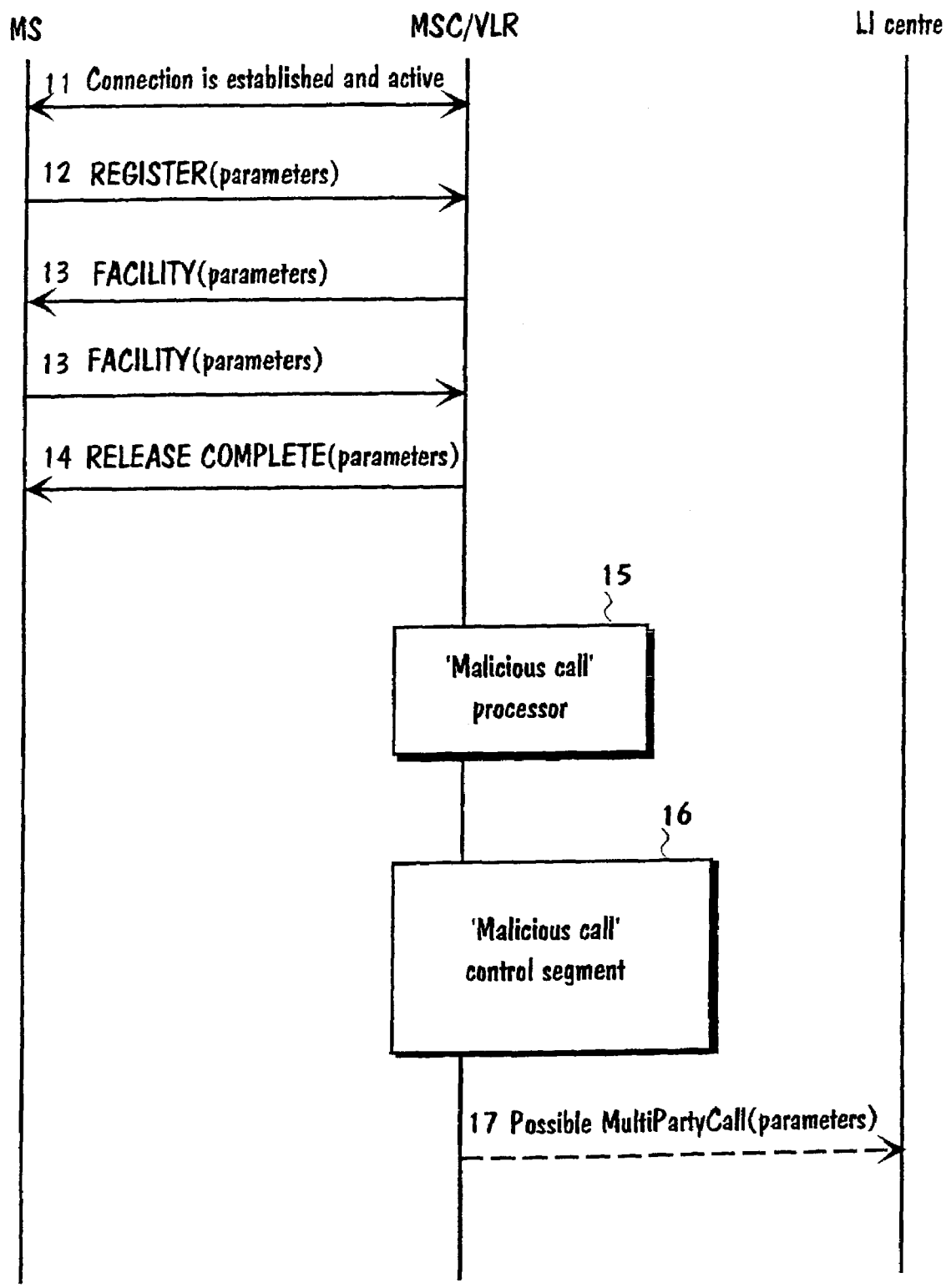

The invention relates to a monitoring report activated in real time by the receiving subscriber and implemented in a telecommunications network, especially in a mobile communication network, in order to trace a malicious call.

TECHNICAL BACKGROUND

Due to data protection, a permit granted by the authorities is needed for tracing malicious calls. The manner in which calls are traced depends on the legislation of each country, and the right of the authorities to tap calls in order to find out malice or crimes varies in different countries.

In Finland, tracing of a malicious call in an ISDN network is a supplementary service (MCID, Malicious Call Identification), wherein the called subscriber may ask the network to trace the identity of a calling subscriber who behaves maliciously. In response to the request, the network stores the identity of the called subscriber, the identity of the calling subscriber, the calling subscriber's sub-address, if there is one, the date and the time of day. The stored information remains known to the operator and to the authorities. The service can be started either during the call or after the calling subscriber has shut off the call within a certain time.

When calling with malicious intention, the calling subscriber may utilise such prevention of identification of the calling subscriber, which can be ordered from the operator. The calling subscriber may hereby activate the prevention of identification from his telephone, whereby his identification data will not end up in the terminal equipment of the called subscriber, in other words, the called subscriber does not see the calling subscriber's telephone number on his terminal equipment. However, the information relating to the calling subscriber's call remains in the calling switching centre.

Tracing of a malicious call is associated with several drawbacks. In older switching centres in particular one must be able to estimate in advance at which time of day the malicious call will come, so that reporting for tracing of the malicious call can be activated.

In certain cases the authorities may start tapping of a telephone automatically. In such a case protection of the victim's privacy is poor, because all calls are hereby tapped, also those, which are not malicious calls.

To date, tracing service has been offered in a fixed network only. In a mobile communication network there is no such feature, by which the individual subscriber could activate an immediate reporting on a malicious call from an active call event.

BRIEF SUMMARY OF THE INVENTION

The invention concerns real-time reporting activated during a call by a subscriber of a called mobile communication network, when a malicious call or message is at issue.

It is an objective of the invention to bring about a solution, by which the malicious caller can be traced quickly and efficiently, because the tracing process is started immediately, already during the connection, after the called mobile subscriber has activated the service in question.

The inventive idea is that the called subscriber activates the tracing service immediately on noticing the malicious call or message, by giving a certain activation code from his subscriber terminal. The activation code is a code which the operator gives to the called subscriber and which relates to real-time tracing reporting of the malicious call. The code to be used is different depending on whether the called subscriber is in the area of the home network or outside the home network.

The logic required for implementation of the service can be installed either in a mobile services switching centre or in an intelligent network, depending on the operator's wishes. With the aid of the called subscriber's special definition of the mobile services switching centre, the activated service process is controlled in different ways, depending on whether the call comes from a mobile communication network or from a public telephone network.

Using the invention, tracing of a malicious call or message can be implemented in a more subscriber-friendly manner than before from the point of view of the called subscriber, because the called subscriber can indicate the malicious caller forthwith while the malicious call is active. Protection of the called subscriber's privacy is hereby also improved, because it is unnecessary to monitor other non-malicious calls. This also has the direct consequence that the tracing process is more advantageous economically in comparison with the present system.

In addition, in the solution according to the invention the operator can define several codes for the called subscriber for activating the tracing service, if this is required. Such a situation may be necessary e.g. if the called subscriber is a public figure subject to malice from several different malicious callers.

LIST OF FIGURES

Figure 2:
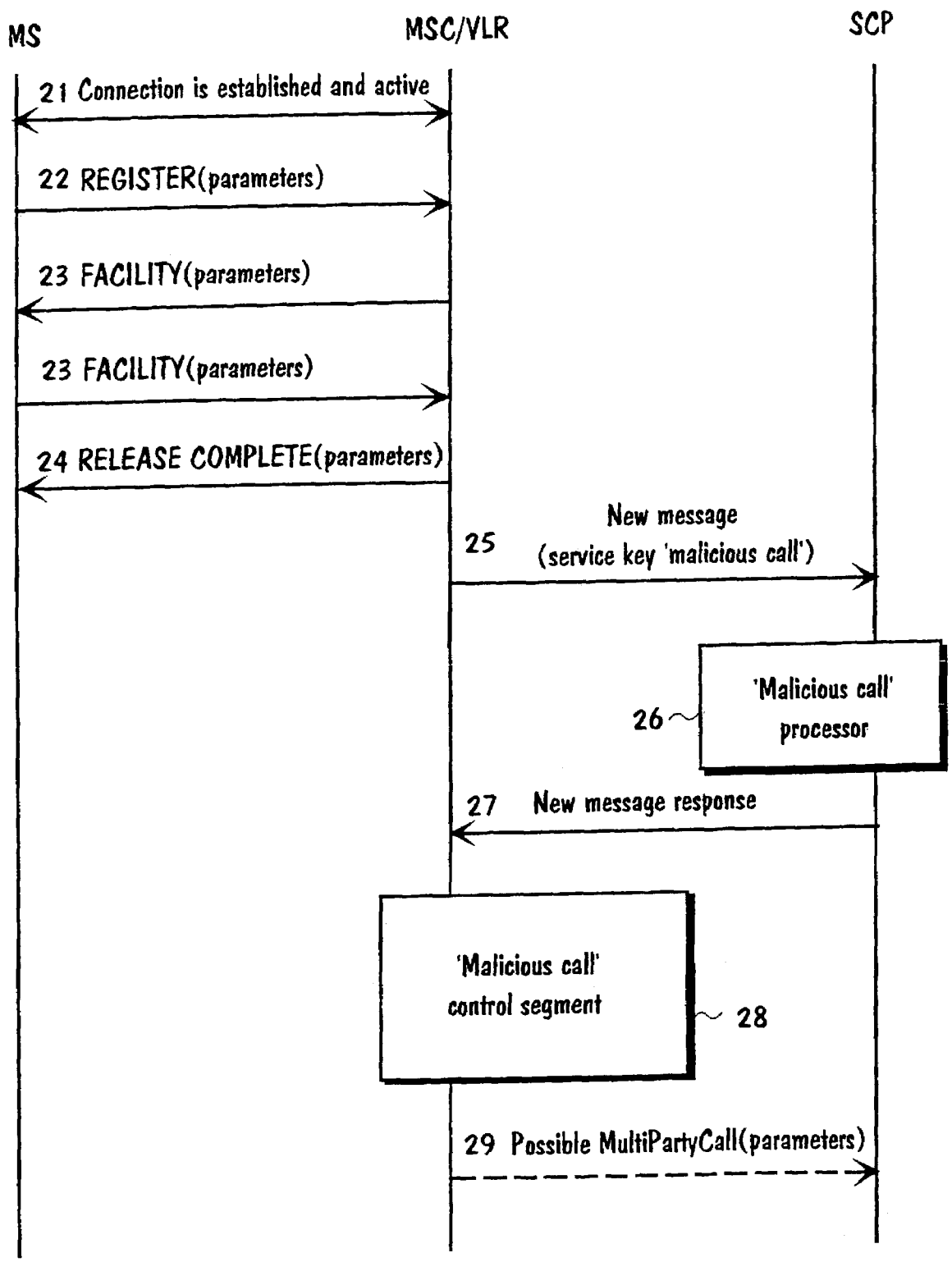
Figure 3:
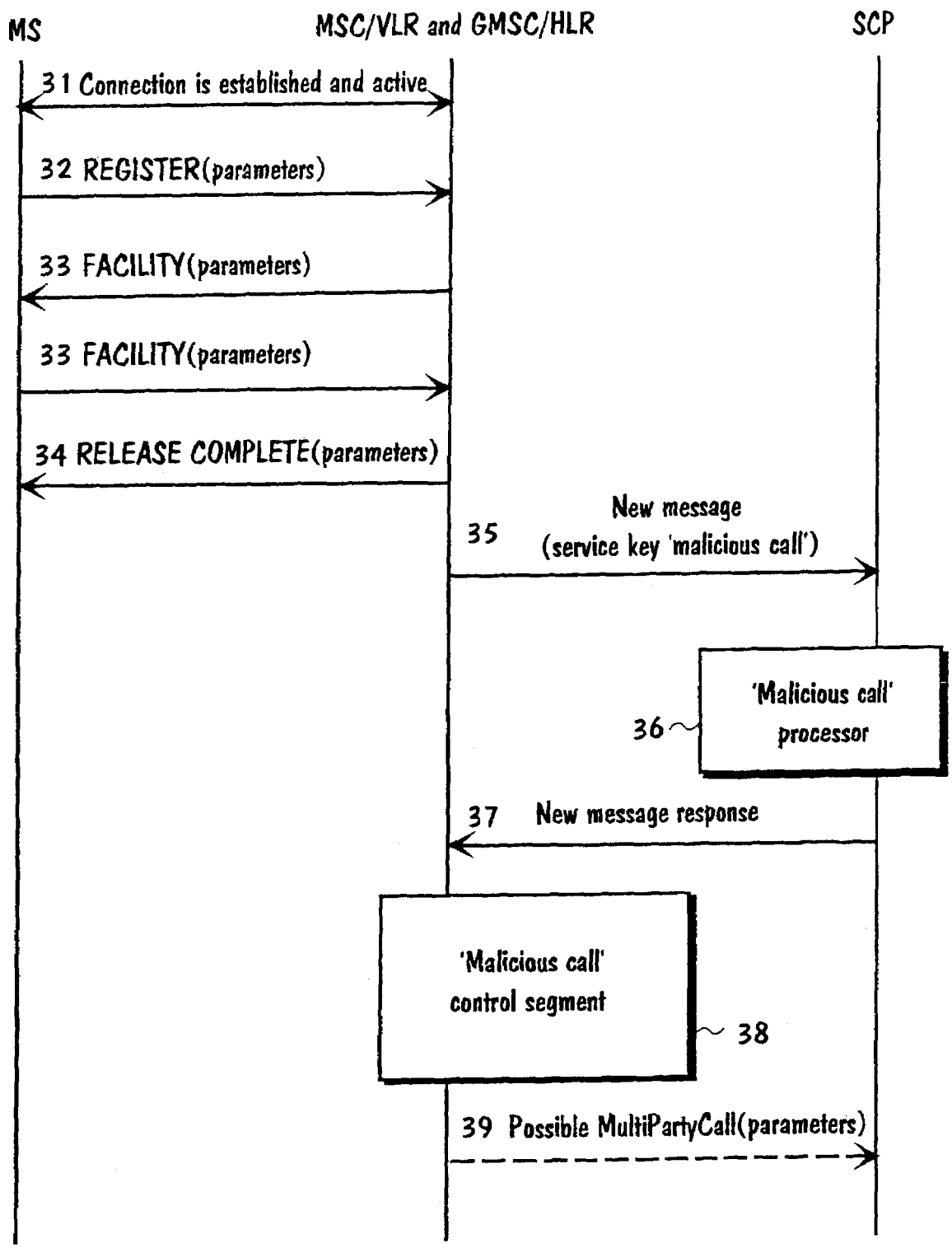

In the following, the invention will be described in greater detail with reference to the appended schematic figures, of which FIG. 1. shows signalling in accordance with a first embodiment of the invention between a mobile station MS, a mobile services switching centre MSC and a LI switching centre, FIG. 2 shows signalling in accordance with a second embodiment of the invention between a mobile station MS, a mobile services switching centre MSC and the service control point SCP of an intelligent network, when the mobile station is in the area of the home network, and FIG. 3 illustrates signalling in accordance with the second embodiment of the invention between a mobile station and a network, when the mobile station is moving outside the home network.

DETAILED DESCRIPTION OF THE INVENTION

According to the definition of ETSI (European Telecommunications Standards Institute), the calling subscriber is also called subscriber A and the called subscriber is called subscriber B. Corresponding names are used in the following.

The operator determines for subscriber B the right to use the malicious call tracing feature and determines the generation function to be used in the tracing process. When the malicious call identification procedure has been invoked in the mobile services switching centre MSC, the mobile services switching centre will generate a tracing report.

On obtaining from the operator the right to use the tracing request service, subscriber B activates the tracing service to find out the number and personal data of subscriber A in real time while the malicious call is active. Correspondingly, the tracing service can be activated also when any message sent with malicious intention arrives in the terminal equipment of the mobile communication network. Such messages are e.g. text or picture messages and speech messages left in the answering machine of the terminal equipment as well as real-time or stored multimedia transmissions.

The logic required for implementation of the tracing service can be installed according to the operator's wish either in an IN (Intelligent Network) or alternatively in a MSC (Mobile Service Switching Centre) and/or in a GMSC (Gateway Mobile services Switching Centre).

The following is a detailed examination of a first and a second embodiment of the invention with the aid of FIGS. 1, 2 and 3.

First Embodiment of the Invention

In the first embodiment of the invention, the tracing logic is installed in a mobile services switching centre MSC and/or in a Gateway Mobile services Switching Centre.

FIG. 1 is a schematic view of signalling between a mobile station MS, a mobile services switching centre MSC MSC/VLR (or GMSC/HLR) and a LI-centre (Legal Interception). It is assumed here that the operator uses the CAMEL feature (Customized Applications for Mobile network Enhanced Logic), which supports such services of the operator's that are not standardised as GSM services even when the mobile station is located outside the mobile station's HPLMN (Home Public Land Mobile Network). The mobile station's Home Public Land Mobile Network means a public mobile communication network, with which the subscriber is registered permanently. The CAMEL feature is a network feature, which supports e.g. outgoing calls from and incoming calls to the mobile station as well as the use of supplementary service messages of the USSD type (Unstructured Supplementary Service Data). USSD messages are used for transferring data in character string form. The character string can be formed e.g. in such a way that the subscriber inputs the character string one character at a time from the keyboard of his telephone. The character string to be used may have the following form: the opening character is an asterisk (*), which is followed by the service code, e.g. a three-digit number, when desired the service code may be followed by a field-separating asterisk (*), which is followed by the service number. The last-mentioned field can also be left out. The closing character of the character string is crosshatches (#). The character string may also be stored in the mobile station's memory. Hereby the user need not know the code by heart and the USSD message will be relayed more quickly to the network.

It is assumed, that subscriber B has answered a call coming from the calling subscriber, that is subscriber A, and a connection has been set up between subscriber A and subscriber B, point 11 in the figure. Subscriber B notices that the call is a malicious call. While the call connection is still active, subscriber B activates the tracing service from the keyboard of his mobile station using the service code SS provided earlier by the operator, which code is e.g. a character string *188#, and pushes the SEND key, whereby the mobile station sends a REGISTER message to the network, point 12. The message includes a facility information part including parameters relating to a request for supplementary service, e.g. ProcessUnstructuredSS-Request (Operation parameter, USSD-string). The characters chosen by the user are transmitted one at a time to the mobile services switching centre. The operator has set off the DTMF (Dual Tone Multi-Frequency) signal, so that subscriber A will not notice the activation of the monitoring report.

The mobile services switching centre MSC notices the service request activated by subscriber B, and if the request contains a sufficient quantity of information, the network will respond to the request with a RELEASE_COMPLETE message to the mobile station, point 14. This message also contains a facility information part, wherein the facility-related parameter is e.g. ProcessUnstructuredSS-Request. In a situation where the request does not contain sufficient information to enable satisfaction of the request, the network will ask the mobile station for additional information. Hereby the network sends a FACILITY message instead of the RELEASE_COMPLETE message to the mobile station, point 13. In response to the network's request, the mobile station sends back the FACILITY message together with the required parameters. Transmission of the FACILITY message back and forth between the mobile station and the network continues until the network has received a sufficient quantity of information needed in the processing. The network closes the Facility procedure by sending a RELEASE_COMPLETE message to the mobile station in the manner described above.

A new programme segment 15, the so-called processor of subscriber B's malicious call, is installed in the switching centre to analyse the characters of the USSD message it has received and to examine the parameters of the malicious case. The parameters typically include several parameter couples, e.g. the couple: LI identifier and USSD character string parameter (1,2, . . . ). Hereinafter the processor of subscriber B's malicious call will simply be called by the short name of call processor.

Information to distinguish different cases from each other is defined in the call processor. This information is also stored in the home and visitor location registers. When required, the programme segment signals to the LI switching centre a logical 'malicious call' object, which contains the case parameter Y relating to the case. This parameter may be joined e.g. to the subscriber number 234567 as an additional parameter, whereby all cases relating to this number will be routed directly to the LI switching centre.

Public figures in particular may be targets for malicious calls from several different subscribers A. The operator may hereby determine several different service codes relating to malicious callers, e.g. *189*N#, for subscriber B. In character string N, one subscriber must be given an integer number relating to different cases of malice, by which the different cases are distinguished from each other. In a case where there is only one malicious caller, parameter N is not needed. The service codes *188# and *189*N# presented above are used in the Home Public Land Mobile Network. When the mobile subscriber is moving outside the home network, eg. abroad, a separate code is defined for activation of the tracing service, which code will be studied later in greater detail. The tracing service is activated in the manner presented above.

In the additional parameter Y of the malicious call control segment a parameter N is included in those cases where when analysing the USSD message the subscriber's service code is found to include the value N. The additional parameter Y indicates the consecutive number of the malicious case, the maximum value of which is e.g. 10.

The cases to be reported are determined in advance in the home location register HLR and in the visitor location register VLR on a subscriber basis. The information to be stored includes e.g. the subscriber's service code SS. In addition, a reporting number obtained from the authorities is configured in the registers together with information of the object of reporting. The operator performs the configuration by way of the MMI interface of the home location register. The type of basic report is generated for the system to be reported from the mobile services switching centre using a new HLR/VLR MMI control set or alternatively by utilising the existing tracing feature used by the legal interception centre.

When the call processor has analysed the received USSD message, it signals activation information to a control segment 16 located in the switching centre of the monitored case. The control segment checks to find out whether the message contains an additional parameter Y, whereby the activation request of the subscriber monitoring is relayed to the LI switching centre. The type of report is chosen based on the contents of the received message. To generate the report there are hereby two alternatives: the report is generated in the mobile services switching centre or the activation information is directed to the LI switching centre, which will generate the report. Point 17 shown by dashed lines illustrates a special situation, wherein the mobile services switching centre reports to the LI switching centre a request to bring about a multiparty call, a so-called conference call. The LI switching centre tape records the call. Of course, the facilities presented above are implemented in such a way that subscriber A is not aware of them. The report contains the required parameters, e.g. the parameters of the call.

In special cases the LI reporting is started as a remote session on the authorities' initiative. Thus, it is possible to do the said configuration in the home and visitor location registers also automatically in the legal interception switching centre, when LI reporting is desired as a response to the service request signal activated by the called party. The implementation alternative depends on the nature of the malicious call. If setting up of a multiparty call is determined, it is configured as one LI case in the home and visitor location registers. Hereby the conference call facility existing in the switching centre is utilised, which facility is activated internally in the switching centre, which means that this differs from the usual activation of a conference call.

Points 11–16 illustrate generally used activation cases.

Second Embodiment of the Invention

In the second embodiment of the invention, monitoring logic is installed in the intelligent network.

FIG. 2 is a schematic view of signalling between a mobile station MS, a mobile services switching centre MSC/VLR (and/or GMSC/HLR) and the SCP (Service Control Point) of the intelligent network. The service control point of the intelligent network is a digital switching centre or a separate computer containing the required software. It contains the service logic, the service control functionality and the service database function. The database is often a SDP (Service Data Point) unit separate from the service control point SCP. The service control point SCP processes the service data of the database with the aid of its own SLP (Service Logic Program) and controls the service switching point SSP. The signalling between the service switching point SSP and the service control point SCP takes place through the intermediary of a common channel signalling network SS7 using the INAP protocol.

The simplest case is studied in the following, that is, it is assumed that subscriber B is in his home network. At point 21 in FIG. 2 the connections between subscribers A and B is set up and the connection is active. Subscriber B activates the tracing service from his mobile station either by entering (or choosing from the memory) the SS code and the *189*N# parameter and by pushing the SEND key, whereby the mobile station will transmit a REGISTER message to the network, point 22. The message contains the corresponding parameters as those at point 12 in FIG. 1. The signals at points 23 and 24 also correspond with signals 13 and 14 in FIG. 1.

At point 25 the mobile services switching centre MSC/VLR transmits to the service control point a message, which contains the service key. The parameter of the service key is 'malicious call'. Based on this, that programme segment is determined, which is to process the case in question. When required, the service control point will ask the VLR for additional information, depending on the case. Such information might be e.g. the LI identifier, a certain state-specific parameter, etc.

In this embodiment, a new programme segment, processor 26 of malicious calls directed at subscriber B, is assumed as being installed at the service control point. Upon receiving the USSD message, the processor asks the VLR for the profile of subscriber B, wherein the parameters relating to the malicious call case of the call processor are determined. The case parameters typically include one or more parameter couples, for example, the couple: the LI identifier and the USSD character string parameter (1,2, . . . ).

The call processor analyses the case parameters of the request for tracing service it has received and the parameters received from the mobile services switching centre relating to subscriber B, such as the mobile subscriber's international ISDN number or the international mobile subscriber's IMSI symbol.

During the call, any other detections of the DP detection points than those relating to the malicious call are directed in the normal manner to the service control point.

When the call processor 26 at the service control point SCP has analysed the received USSD message, it signals at point 27 activation information to the control segment 28 located in the switching centre of the monitored case. The programme segment checks to find out whether the message contains an additional parameter Y, whereby the activation request of the subscriber monitoring is relayed to the LI switching centre. Starting of the legal interception is activated in case LI reporting is desired in response to the service request signal activated by the called party. The message must be transmitted no later than by the end of the call connection.

Control segment 28 selects the type of report based on the contents of the received message. There are two alternatives for generating the report: the report is generated at the mobile services switching centre or the activation information is directed to the LI switching centre, which generates the report.

Point 29 shown in dashed lines illustrates a situation, wherein the mobile services switching centre MSC reports to the LI switching centre a request for setting up a multiparty call. The report contains the required parameters, e.g. the call parameters.

Generation of the malicious call report is activated at that stage at the latest, when 'Detection point of Disconnect' is activated, in other words, when the called subscriber shuts off the call. The time of generation of reporting is determined more exactly depending on what system level is supported by the CAMEL feature. New signalling interfaces are made as required between the mobile services switching centre and the service control point on an application-specific basis.

It should be noticed that both in the first embodiment and in the example presented above a code was used, which is determined for use in the home network only. If the mobile station is outside the home network, e.g. abroad, the operator determines a separate SS code, e.g. *144*N#, for subscriber B. This is due to the feature associated with the HPLMN network of the mobile station, wherein the subscriber when moving outside the home network, e.g. abroad, and when he desires a service supporting USSD, is always routed to the home network for implementation of the service. In such a situation, the tracing service is carried out in the gateway mobile services switching centre (GMSC). The USSD code is routed to the home network of subscriber B on the condition that the operator in the country concerned has made an agreement with the operator at home. Hereby the foreign mobile services switching centre MSC/VLR sends a command message by way of the gateway mobile services switching centre in his own country to the gateway mobile services switching centre of the home network in the subscriber's home country, which receives subscriber profile information from the home location register. In practice, the gateway mobile services switching centre functions in the same way as an ordinary mobile services switching centre.

FIG. 3 is a schematic view illustrating signalling between a mobile station MS, a mobile services switching centre MSC/VLR and a GMSC/HLR and the service control point SCP of an intelligent network. In practice, points 31–39 in the figure correspond with points 21–29 in FIG. 2, however, so that at point 35 the gateway mobile services switching centre GMSC/HLR sends to the service control point a message, which contains the service key. When required, the service control point asks the home location register HLR for additional information, depending on the individual case. The call processor 36 installed at the service control point requests subscriber B's profile from the home location register HLR, in which profile those parameters of the call processor are defined which relate to the malicious call event.

When the subscriber is moving in a foreign network, there is of course more signalling than in the case of a home network, since here signalling takes place both through the foreign and the domestic gateway mobile services switching centre. Signalling is based on known signalling mesages defined for the mobile communication network, so for the sake of simplicity they are not shown in the figure.

Thus, in order to trace the origin of a malicious call it is possible to use several different types of reporting depending on in which country the calling and the called subscriber are and what the concerned country's legislation is like. Reporting information of various types is stored in the called subscriber's home location register, from which the visitor location register gets this information when required for the mobile services switching centre. The malicious call control segment in the mobile services switching centre utilises the information stored in the register in the generation of the report.

The definition of a malicious call used above for general use is not so extensive as cases of legal interception. The tracing reporting of the called subscriber is activated only when the called subscriber activates reporting from his mobile station in the manner described above. Thus, reporting is not started automatically e.g. in connection with updating of location, as is usually done in cases of legal interception.

Of course, the example where the mobile station is outside the home network functions in a corresponding manner also in the first embodiment of the invention.

In the examples presented in the foregoing, the switching centre of subscriber B also includes a special definition for the ending of the call, in other words, a) has the call been shut off normally or b) is the call in the call state. Irrespective of whether subscriber A or subscriber B has shut off the call, the switching centres of both parties can when required continue signalling still in the speech state. The operator later shuts off the connection by a command given to the operating and maintenance interface.

The described signalling is only by way of guidance. There is an infinite number of different alternatives, because the service can be custom made for different operators, in compliance with the legislation of each country. The features to be reported depend on approval by the authorities and they are classified as "legal functions". As has been explained above, the logic can be installed according to the operator's wishes either in a MSC or in an IN. The manner of installation determines what kind of signalling and routing is to be used in the implementation.

In some cases it is possible to define a set of subscribers, for whom the same code is used in order to activate the tracing service. One such situation could be e.g. when possibly the same subscriber A makes malicious calls to several different subscribers B.

In a PSTN network subscriber B may activate the tracing service in the same way as in a mobile communication network, that is, by entering the so-called pseudo selection code *188*N# from the keyboard.

The tracing service can also be activated from other kinds of mobile terminal equipment than from a mobile station. Activation may be done also in other ways than by pushing keys, depending on the terminal equipment in question.

Although in the examples above the malicious message is mainly presented as a real-time telephone conversation, the solution according to the invention may also be applied e.g. to real-time multimedia broadcasts and to text and picture messages and to stored speech, text and multimedia broadcasts. In the case of stored messages, the called subscriber activates generation of a monitoring report on the malicious message immediately on noticing the message, in a manner corresponding with those presented in the examples.

The invention claimed is:

1. Method of tracing a malicious call in a mobile communication network, the method comprising:
    sending, in real time from a called subscriber terminal equipment, a service request to means for processing tracing of malicious calls in the mobile communication network;
    receiving the service request in said means for processing tracing of malicious calls;
    analyzing the service request in said means for processing tracing of malicious calls;
    based on the analysis of the service request, activating a real time tracing process in the means for processing tracing of the malicious call in the mobile communication network in order to find out the identity of the malicious caller, wherein the tracing of the malicious caller is controlled depending on one of the country of origin of the malicious call, the country of location of the called subscriber terminal equipment, the type of communication network from which the malicious call originates, and a predefined type of malicious callers, and
    reporting the result of the tracing process to the called subscriber terminal equipment.

2. Method as defined in claim 1, wherein the service request given from the called subscriber's terminal equipment is a service code defined by the operator.

3. Method as defined in claim 2, wherein at least one service code is defined for the called subscriber.

4. Method as defined in claim 1, wherein connection with the tracing an analysis of the calling subscriber's number is performed.

5. Method as defined in claim 1, wherein the means for processing tracing of the malicious call are located in a mobile services switching centre.

6. Method as defined in claim 1, wherein the means for processing tracing of the malicious call are located at the service control point of an intelligent network.

7. Mobile communication system including a mobile services switching centre and several pieces of subscriber's terminal equipment, between which a connection can be set up, comprising:
- means, in the switching centre, for processing tracing of malicious calls configured to trace in response to a service request activated by a called subscriber from his terminal equipment in response to a call from a calling subscriber;
- means, in the switching centre, for performing tracing of the calling subscriber in order to find out the identity of the calling subscriber; and
- means, in the switching centre, for forming a monitoring report, wherein the means for performing tracing of the calling subscriber is controlled depending on the one of the country of origin of the malicious call, the country of location of the called subscriber terminal equipment, the type of the communication network the malicious call originates from, and a predefined type of malicious callers.

8. Mobile communication system including intelligent network architecture and including a mobile services switching centre, a service control point and several pieces of subscriber's terminal equipment, between which a connection can be set up, comprising:
- means, in the service control point, for processing tracing of malicious calls configured to trace in response to a service request activated by a called subscriber from his terminal equipment in response to a call from a calling subscriber;
- means, in the service control point, for performing tracing of the calling subscriber in order to find out the identity of the calling subscriber; and
- means, in the service control point, for forming a monitoring report,
- wherein the means for performing tracing of the calling subscriber is controlled depending on the one of the country of origin of the malicious call, the country of location of the called subscriber terminal equipment, the type of the communication network the malicious call originates from, and a predefined type of malicious callers.

* * * * *